June 20, 1967 H. E. GOINGS 3,326,445
CAR SEAT TRAY
Filed May 26, 1965
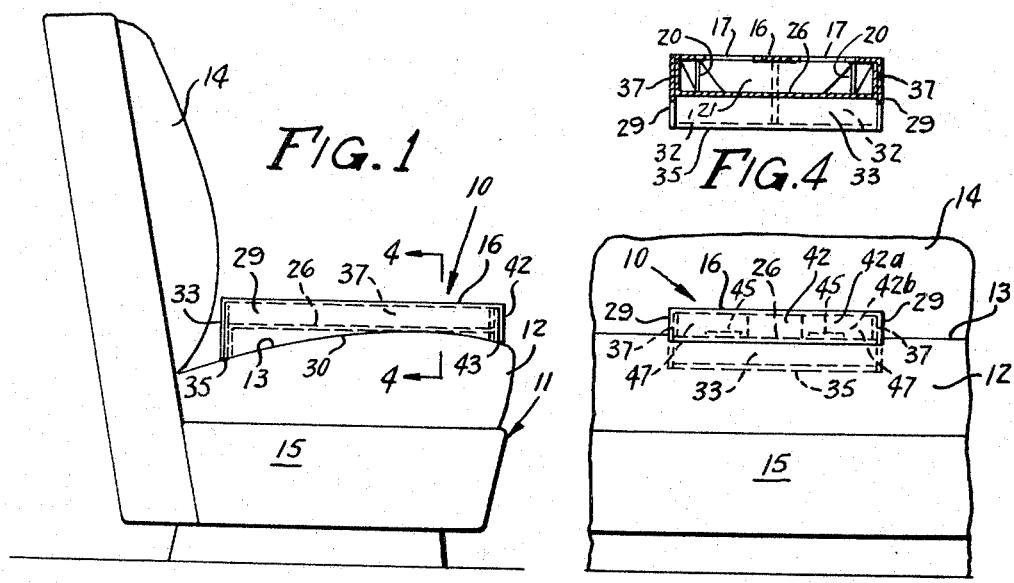
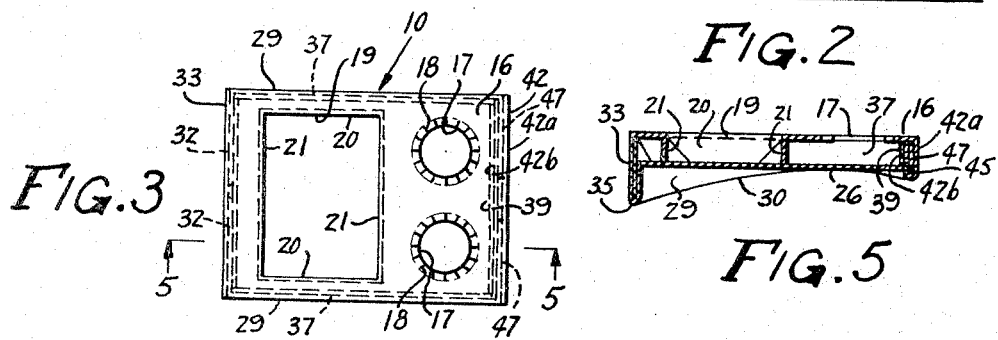
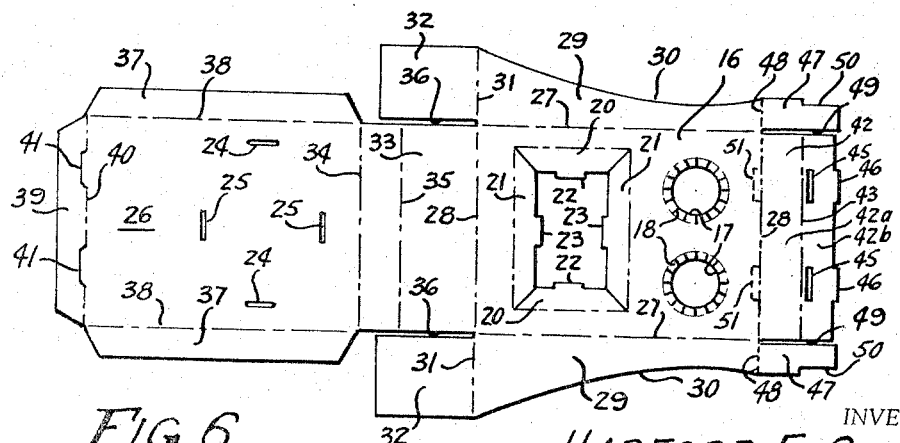
INVENTOR.
HARFORD E. GOINGS
BY Kimmel, Crowell & Weaver
ATTORNEYS.

United States Patent Office 3,326,445
Patented June 20, 1967

3,326,445
CAR SEAT TRAY
Harford E. Goings, 5428 Center Drive SE.,
Washington, D.C. 20031
Filed May 26, 1965, Ser. No. 458,961
8 Claims. (Cl. 229—28)

This invention relates to a car seat tray and more particularly to that type of tray utilized in drive-in restaurants or the like, wherein food or beverages are served to the occupants of a motor vehicle to be eaten in the vehicle.

An important object of this invention is the provision of a tray of this character which may be positioned on the seat of the vehicle and between two passengers, and which is so contoured to the configuration of the seat as to maintain the food or beverages in level, readily accessible position.

An additional object of the invention is the provision of a tray of this character having a top surface provided with recesses for the accommodation of food or beverages in cups or bottles so designed as to retain the articles in position so that it may be loaded at a remote point and carried to the vehicle with a minimum of effort and difficulty.

Still another object of this invention is the provision of a tray of this character which is formed from a single sheet of relatively heavy, inexpensive material such as heavy duty cardboard, which may be stamped in a single operation, shipped flat, and folded prior to use.

Still another object of this invention is the provision of a tray of this nature which is relatively inexpensive to manufacture, and which may, if desired, be utilized only once and then disposed of, thus enhancing the sanitary qualities of the tray and the protection of the patrons, as well as eliminating the problem of washing and disinfecting used trays.

Still another object is the provision of a device of this character which is sturdy and durable in construction, reliable and efficient in use, and simple and inexpensive to manufacture, assemble, and utilize.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a side elevational view of one form of car seat tray embodying the instant inventive concept shown in position on the seat of a motor vehicle, certain concealed parts thereof being indicated in dotted lines;

FIGURE 2 is a front elevational view of the tray of FIGURE 1 shown in position on the car seat, portions of the latter being broken away, and certain concealed parts of the former being indicated in dotted lines;

FIGURE 3 is a top plan view of the tray of FIGURE 1 moved from the car seat;

FIGURE 4 is a sectional view taken substantially along the line 4—4 of FIGURE 1 as viewed in the direction indicated by the arrows;

FIGURE 5 is a sectional view taken substantially along the line 5—5 of FIGURE 3 as viewed in the direction indicated by the arrows;

FIGURE 6 is a top plan view of the blank from which the tray is formed shown prior to folding.

Similar reference characters refer to similar parts throughout the several views of the drawing.

Having reference now to the drawings in detail, and more particularly to FIGURE 1, there is generally indicated at 10 a car seat tray constructed in accordance with the instant invention, positioned on the surface of a car seat generally indicated at 11 and including a seat cushion 12 having a generally arcuate top surface 13 of conventional design, and a back cushion 14. The seat is provided with any conventional supporting structure 15, and may comprise either the front or rear seat of an automobile or other vehicle.

Tray 10 consists essentially of a top surface 16 which is provided with a plurality of circular openings 17, which are surrounded by radial severance lines 18, the openings being adapted for the reception of cups or bottles containing desired beverages, and the radial serrations providing quasi-resilient gripping means therefor. A generally rectangular opening 19 in top wall 16 is provided for the reception of food, such as sandwiches, either on plates or in packages, or the like, and includes normally depending side and end walls 20 and 21 respectively, which fold downwardly about the perimeter of the opening 19. Side and end walls 20 and 21 are provided with locking tabs 22 and 23 respectively, which engage in slots 24 and 25 respectively of a bottom wall member 26 which it normally arranged to extend in horizontal position substantially parallel to top wall 16.

Means, to be more fully described hereinafter, are provided for holding the parts in related assembly, it being readily apparent from the foregoing that there is herein provided a tray which, when placed on the seat of a vehicle, will readily accommodate a desired quantity of food and beverage for two or more passengers occupying the seat, the tray preferably being located conveniently between the passengers so as to be readily accessible to either or both occupants of the seat.

Referring now particularly to FIGURE 6 disclosing the blank from which the tray is formed, it will be seen that top wall 16 is defined by a pair of scored side fold lines 27, and a pair of similarly scored end fold lines 28. Extending from side fold lines 27 are a pair of side wall portions 29 which are connected by an outer or bottom edge 30 of arcuate configuration which conforms generally to the conventional contour of a vehicle seat, the rear portion thereof being of substantially greater extent or height than the forward portion, io that when the tray is assembled bottom wall 26 and top wall 16 will be maintained in substantially level horizontal position. At the rear end of each side wall 29 is a fold line 31, aligned with the rear fold line 28, from each of which extends a substantilly rectangular rear tab 32. A rear wall portion 33 extends from rear fold line 28 and comprises an integral portion of bottom wall 26, being separated therefrom by a fold line 34. An intermediate fold line 35 extends transversely across rear wall 33, the ends of rear wall 33 being separated from the edges of tabs 32 by cut slots 36. The distance between fold lines 28 and 35 is substantially equal to the lateral distance between the slots 36 and the outer edges of the tabs 32, to permit the latter to be folded inwardly, in a manner to be described more fully hereinafter, when the device is in assembled relation.

From the opposite sides of bottom wall 26 reinforcing flanges 37 extend from fold lines 38, the width of the tabs 37 being substantially equal to the spacing between top wall 16 and bottom wall 26, when the parts are in assembled relation. A rear flange 39 extends from the end of top wall portion 26 opposite fold line 34, and is defined by a further fold line 40. Locking tabs 41 are cut out of flange portion 39, and extend in the plane of bottom wall 26 for a purpose to be more fully described hereinafter.

Referring back now to top wall 16, a front wall portion 42 extends beyond fold line 28, and includes a fold line 43 parallel to the fold line 28 which separates the front wall portion into inner and outer components 42a and 42b. Outer component 42b, which when folded becomes the inner front wall, is provided with a pair of slots 45, the purpose of which will be more fully described hereinafter, and on its outer edge with a pair of locking tabs 46.

Extending from the front ends of side walls 29 are an additional pair of tabs 47, which are separated from the front ends of the side walls by fold lines 48 and which, in the blank, are separated by front walls 42 and slots 49 which are open at their outer ends. The outer edges of the tabs 47 are cut away as at 50 for a purpose which will become apparent hereinafter.

In the assembly of the tray from the blank, side walls 29 are first folded inwardly along fold lines 27, and tabs 32 and 47 folded inwardly beneath top wall 16 along their respective fold lines 31 and 48 in perpendicular relation thereto. Front wall 42 is then folded into two parts 42a and 42b along fold lines 28 and 43 in overlying relation to the tabs 47, with the slots 45 aligned with the cutaway portions 50, and the locking tabs 46 engage in depressed recesses 51, which are stamped partially through the underside of top wall 16. This forms, in effect, a substantially triple thickness front wall, which is locked in folded position, and which at the same time serves to retain the front ends of side walls. Subsequently, rear wall 33 is folded along fold line 28 downwardly relative to the top wall 16, and thence upwardly along fold line 35 to underlie inturned tabs 32. Side flaps or portions 37 are folded upwardly, as is flap 39, so that their upper edges abut the underside of top wall 16 and serve effectively as spacers for bottom wall 26 therefrom. The projecting tabs 41 are then engaged in slots 45 effectively to lock the bottom wall in position relative to the top wall 16. The final step of the assembly consists in folding the flaps 20 and 21 downwardly relative to the top wall 16 into the opening 19 so that their respective tabs 22 and 23 extend into the slots 24 and 25, and by their engagement therein effectively lock the components in related assembly.

The assembled tray is now ready for use, and may be loaded at a remote station, carried by a waiter with a minimum of effort and difficulty to a vehicle, and positioned by the occupants on the seat between them, the arcuate contour of side walls 29 engaging the corresponding arcuate top 13 of seat 12, with the rear wall 33 seating snugly against the rear cushion 14, the bottom wall serving effectively to hold food placed through openings into the recesses.

From the foregoing it will now be seen that there is herein provided an improved car seat tray which accomplishes all of the objects of this invention, and others, including many advantages of great practical utility and commercial importance, which may be manufactured and sold with an absolute minimum of cost and effort, a single stamping operation being sufficient to cut the complete blank, and which may be advantageously utilized wherever such a tray is needed or desirable.

As many embodiments may be made in the inventive concept hereinbefore shown and described, and as many modifications may be made in this embodiment hereof, it is to be understood that all matter herein is to be interpreted merely as illustrative and not in a limiting sense.

I claim:

1. A car seat tray comprised of a single sheet of foldable material formed to define a top wall having article receiving openings therein, a rear wall extending from an end of said top wall, a bottom wall extending from said rear wall beneath said top wall and parallel thereto, a front wall extending from the other end of said top wall, parallel to said rear wall, means securing the front end of said bottom wall to said front wall, side walls depending from said top wall, the lower edges of said side walls being concavely arcuate to conform to the configuration of a car seat, and means securing said side walls in assembled relation with said front and rear walls, said rear wall and said front wall each comprising a reverted double thickness of material, and the means securing said side walls comprising tabs at each end of said side walls folded inwardly between the double thickness of said front and rear wall.

2. The structure of claim 1 wherein locking tabs extend from the front end of said bottom wall, slots are formed in the inner thickness of said front wall receiving said locking tabs to form the means securing said bottom wall to said front wall.

3. The structure of claim 2 wherein at least one of said article receiving openings is substantially rectangular, walls are formed on the inner edges thereof and locking tabs are provided on the inner edges of said walls, said bottom wall having slots therein for the reception of said locking tabs when said walls are folded downwardly to define sides for said rectangular openings.

4. A blank for forming a car seat tray comprising a single sheet of foldable material stamped to define a top wall portion having openings therein, a rear wall portion extending from one end of said top wall portion and having an intermediate transverse score line, a bottom wall portion extending from the other end of said rear wall portion, score lines defining side and end flanges on said bottom wall portion, locking tabs struck from the fold line between said bottom wall and said end flange, a front wall portion extending from the other end of said top wall and having a transverse substantially central fold line, said front wall portion having openings therein adapted for the reception of said locking tabs, side wall portions separated by fold lines from the sides of said top wall portions, each side wall portion having a concavely arcuate outer edge, end flaps sepaarted from each end of each side wall portion, and means defining severance lines separating each end flap from the adjacent front and rear end wall portions.

5. The blank of claim 4 wherein said openings in said top wall include a circular opening having radial severance lines stamped about its periphery.

6. The blank of claim 4 wherein said openings in said top wall include a rectangular opening, inwardly extending flanges about the internal perimeter of said rectangular opening, and locking tabs on the inner edges of said flanges, and said bottom wall is provided with slots adapted to receive said last-mentioned locking tabs.

7. The blank of claim 4 wherein the concavely arcuate edges of said side wall portions include high portions adjacent said rear wall portion and lower portions adjacent said front wall portion with a substantially parabolic curve extending therebetween in conformity to the conventional configuration of a motor vehicle seat cushion.

8. A blank for forming a car seat tray comprising a single sheet of foldable material stamped to define a top wall portion having openings, therein, a rear wall portion extending from one end of said top wall portion and having a intermediate transverse score line, a bottom wall portion extending from the other end of said rear wall portion, score lines defining side and end flanges on said bottom wall portion, locking tabs struck from the fold line between said bottom wall and said end flange, a front wall portion extending from the other end of said top wall and having a transverse substantially central fold line, said front wall portion having openings therein adapted for the reception of said locking tabs, side wall portions separated by fold lines from the sides of said top wall portions, end flaps separated from each end of each side wall portion, and means defining severance lines separating each end flap from the adajcent front and rear end wall portions.

References Cited

UNITED STATES PATENTS

| | | | |
|---|---|---|---|
| 2,258,716 | 10/1941 | Ralph et al. | 206—72 X |
| 2,695,712 | 11/1954 | Kolander. | |
| 2,808,191 | 10/1957 | Cramer | 229—30 |
| 2,875,940 | 3/1959 | Dunn | 229—30 |
| 3,145,848 | 8/1964 | Wood | 206—72 X |
| 3,244,125 | 4/1966 | Mackey | 108—44 |

JOSEPH R. LECLAIR, *Primary Examiner.*

DAVIS T. MOORHEAD, *Examiner.*